Sept. 13, 1938. S. A. SNELL 2,130,252
SEAT POST MOUNTING
Filed Dec. 27, 1937
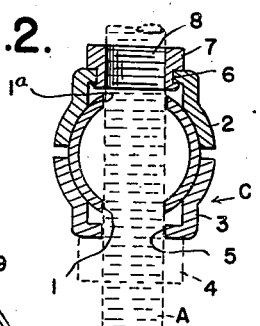
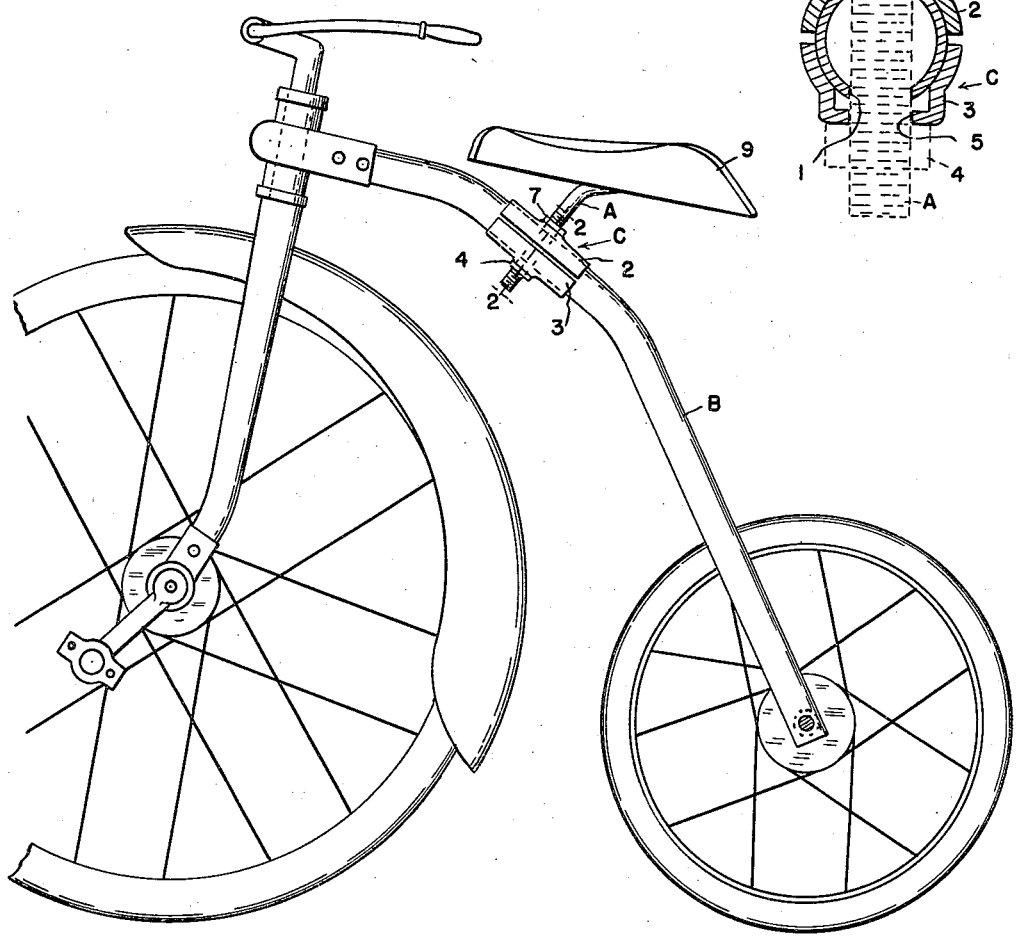
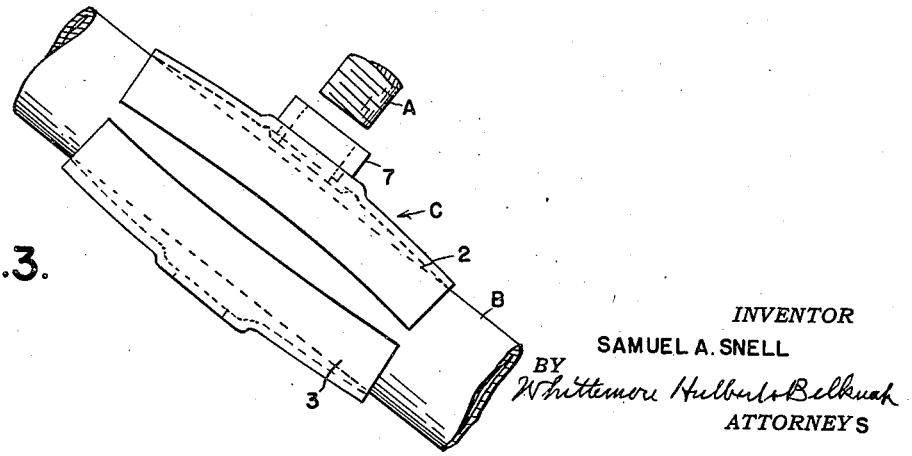
INVENTOR
SAMUEL A. SNELL
BY Whittemore Hulbert Belknap
ATTORNEYS Patented Sept. 13, 1938

2,130,252

UNITED STATES PATENT OFFICE 2,130,252

SEAT POST MOUNTING

Samuel A. Snell, Toledo, Ohio, assignor to The American-National Company, Toledo, Ohio, a corporation of Ohio Application December 27, 1937, Serial No. 181,912

4 Claims. (Cl. 287—54)

This invention relates generally to seat post mountings for velocipedes and consists of certain novel details of construction, combinations and arrangements of parts, that will be hereinafter more fully described and particularly pointed out in the appended claims.

One of the essential objects of the invention is to dispense with welding and brazing a reinforcement for the backbone at the hole for the seat post and to provide a mounting that may be individually plated or finished a different color than the backbone, as desired.

Another object is to provide a mounting that strengthens the backbone and takes the strain at the seat post hole.

Another object is to provide a mounting having cooperating gripping portions that are cambered so as to serve as lock washers for the mounting attaching means.

Other objects, advantages and novel details of construction of this invention will be made more apparent as this description proceeds, especially when considered in connection with the accompanying drawing, wherein:

Figure 1 is a side elevation of a velocipede having a seat mounting embodying my invention;

Figure 2 is a sectional view taken on the line 2—2 of Figure 1;

Figure 3 is an enlarged fragmentary side elevation of the seat mounting.

Referring now to the drawing, A is the seat post, B is the supporting backbone, and C is the mounting embodying my invention.

In the present instance the seat post A is cylindrical in configuration and is mounted for vertical adjustment in vertically aligned holes 1 and 1ª in the tubular backbone. Preferably this mounting C comprises a pair of cooperating substantially channel-shaped stampings 2 and 3, respectively, and a cooperating nut 4. As shown, the stampings 2 and 3 are cambered so that their greatest gripping action is at opposite ends thereof. The lower stamping 3 has a circular hole 5 registering with the opening 1 in the backbone for receiving the post A, while the upper stamping 2 has a larger hole 6 receiving a bushing 7. Preferably this bushing is rigidly secured in the hole 6 in the upper stamping and is interiorly threaded. The post A is exteriorly threaded for engagement with the threads 8 in the bushing 7 and for engagement with the nut 4.

In use the post A may be rotated in the bushing 7 to position the seat 9 carried by the post at the position desired relative to the backbone B. The nut 4 is then drawn up on the post A to cause the parts to be effectively tightened. Inasmuch as the stampings 2 and 3 are cambered, it will be apparent that the ends of the stampings will grip the backbone tightly and such stampings will act as lock washers to prevent the post A and nut 4 from working loose. Thus, it will be apparent that the stampings 2 and 3 strengthen the backbone and relieve the same of strain at the holes 1 and 1ª for the seat post. Moreover, such stampings may be plated or otherwise finished differently than the backbone, if desired, to improve the general appearance of the velocipede.

What I claim as my invention is:

1. Means for mounting a seat post upon a backbone of a velocipede, comprising a pair of complementary stampings for gripping engagement with said backbone, a bushing carried by one of said stampings and interiorly threaded for engagement with said seat post, and a nut adjustable on the seat post adjacent the other stamping, said stampings being cambered whereby they function as lock washers to prevent the parts from working loose after the nut aforesaid has been drawn upon the post against the adjacent stamping.

2. The combination with a velocipede backbone having a hole therein for a seat post, and a mounting for said seat post including cambered stampings bridging said hole, opposite ends of said stampings gripping said backbone, and means substantially midway the ends of said stampings for threadedly engaging the seat post, said means including a load carrying member fixed to one of the stampings and a cooperating adjustable element for clamping engagement with the other of said stampings.

3. The combination with a velocipede backbone having a hole therein for a seat post, and a mounting for said seat post including cambered stampings spanning said hole at opposite sides of said backbone, opposite ends of said stampings gripping said backbone, and interiorly threaded elements substantially midway the ends of said stampings for threadedly engaging said seat post, one of said elements being rigid with one of said stampings.

4. The combination with a tubular backbone of a velocipede provided in the upper and lower walls thereof with aligned openings, and a seat post engaging said aligned openings, of a mounting for said seat post including substantially channel-shaped cambered stampings embracing the upper and lower sides of said backbone and spanning said openings, said stampings having holes in alignment with the openings in the backbone, a bushing fixed in the hole in one stamping and threadedly engaging said seat post, and means adjustable on the seat post adjacent the other stamping to flatten both stampings to hold the parts against movement on the backbone.

SAMUEL A. SNELL.